United States Patent [19]

Roba et al.

[11] Patent Number: 4,711,652

[45] Date of Patent: Dec. 8, 1987

[54] METHOD OF PRODUCING HALIDE GLASS, ESPECIALLY FOR OPTICAL COMMUNICATIONS

[75] Inventors: Giacomo Roba, Genova; Eros Modone, Turin, both of Italy

[73] Assignee: Cselt-Centro Studi e Laboratori Telecomunicazioni S.p.A., Turin, Italy

[21] Appl. No.: 840,422

[22] Filed: Mar. 17, 1986

[30] Foreign Application Priority Data

Apr. 3, 1985 [IT] Italy .................... 67325 A/85

[51] Int. Cl.⁴ .................... C03B 19/06; C03B 37/018
[52] U.S. Cl. .................... 65/18.2; 65/DIG. 16; 501/40

[58] Field of Search .................... 65/18.2, DIG. 16; 501/40, 904, 37; 423/489, 491, 492, 494, 496, 497

[56] References Cited

U.S. PATENT DOCUMENTS 4,352,787 10/1982 French .................... 423/497
4,378,987 4/1983 Miller .................... 65/18.2

FOREIGN PATENT DOCUMENTS 57-175743 10/1982 Japan .................... 65/DIG. 16

*Primary Examiner*—Kenneth M. Schor
*Attorney, Agent, or Firm*—Karl F. Ross; Herbert Dubno

[57] ABSTRACT

The process for manufacturing halide glasses uses a reaction between organometallic and inter-halide or halide-derived compounds, started at a temperature ranging from the highest melting temperature and the lowest boiling temperature of the compounds used.

5 Claims, No Drawings

METHOD OF PRODUCING HALIDE GLASS, ESPECIALLY FOR OPTICAL COMMUNICATIONS

FIELD OF THE INVENTION

The present invention relates to an industrial for manufacturing optical transmission means for telecommunications systems using light radiations and, more particularly, to a process of manufacturing halide glasses.

BACKGROUND OF THE INVENTION

Various materials exist for which a minimal intrinsic attenuation of the order of $10^{-2}$ to $10^{-4}$ dB/km can be predicted in the spectral region comprised between 2 and 12 μm. They are therefore considered to be suited to the fabrication of extremely low loss optical fibers to be used for transmission systems with widely-spaced repeaters, operating in the medium infrared. Yet, materials used to manufacture optical fibers must have various characteristics not only of the optical type: namely high mechanical resistance, chemical and structural stability, low reactivity with the environment.

Among the various materials those, whose characteristics more strictly satisfy these requirements, are halide glasses and, more particularly fluoride and chloride glasses having metal fluorides and chlorides as basic compounds.

Even though glass structures derived from elements of Group II of the Periodic Table (Be, Zn, Ba) or of Group III (Al, Sc, La, Th) may be used, matrices derived from the elements of Group IV (Hf, Zr) have proved to be particularly suited for the optical transmission in the medium infrared, ranging from 2 to 8 μm. Fluorohafnate and fluorozirconate glasses, discovered in France in 1976, are in common use and have all the characteristics necessary for a material to be used in the optical telecommunications field.

Chloride-based glasses have also been lately manufactured and their basic properties are now being investigated. See e.g. the paper entitled "Cadmium halide glasses", di M. Mateki et al, *The Journal of Non-Crystalline Solids*, 56 (1983), pages 81–86.

These glasses are also very promising since they present a minimum attenuation value at wavelengths higher than those of fluoride glasses. Namely chloride glasses have an attenuation minimum in the 6 μm region, while the attenuation minimum of the fluoride glass is in the neighborhood of 3 μm.

Hence the chloride glasses have a wider optical passband and consequently a lower attenuation value.

Optimal performances can be obtained by the use of glass manufacturing processes ensuring ultra-high purity levels and perfect optical guide structure.

These requirements can only be met by processes very similar to the well known chemical vapor phase deposition (CVD) or anyway by processes exploiting the synthesis of liquid or vapor phase reactants. In these states, in fact, a reactant can attain a very high purification degree and the reaction can take place at temperatures much lower than those required of solid reactants, thanks to the close contact between the parts, ensured by the fluid state.

A low temperature reaction is to be preferred not only for economical reasons, but also because it permits a separation between the reactive phase and the phase in which the optical fiber guide structure is built up.

In fact, if the reaction certainly occurs below a certain maximum temperature, the temperature of the first treatment of the solid particles produced can be selected at will.

One can thus operate under the best matrix vitrificability conditions. Besides, at low temperature the space arrangement of the produced material can be maintained, thus avoiding the rise of perturbations in the guide structure.

Such a space arrangement is still maintained thanks to the low-reaction temperature, as gaseous products are evacuated without giving rise to turbulence in the reaction mass.

The optical fibers produced with multi-component fluoride or chloride-based glasses can reach minimum attenuation values of the order of $10^{-3}$ dB/km and hence they can be used in ultra-long distance connections, e.g. they can be installed in transatlantic cables with very few if any intermediate repeaters.

Of course, it is advisable to provide very long fiber trunks, in order to reduce as much as possible the number of splices. In fact fiber splices introduce minimum attenuation values of about 0.1 dB; that is why each splice produces the same attenuation of about 100 km of optical fiber made of the glasses described.

Hence processes of continuous fiber production are required, i.e. processes wherein glass production, preform manufacture and drawing can be effected without interruption.

Processes of this kind are already known, even though the used compounds are generally solid or the production of glass in powder state is effected off line.

DESCRIPTION OF THE INVENTION

These disadvantages are overcome and the above-described technical problem is solved by the process provided by the present invention which allows the production of multi-component halide glasses, but operating at low temperature during the reaction step, and hence it allows the fabrication of ultra-low loss optical fibers effective in the medium infrared region.

In addition fiber trunks of any desired length can be obtained.

The present invention provides a process for manufacturing halide glasses wherein the glasses are obtained from the reaction between organometallic compounds, which are liquid at ambient temperature and do not have oxygen in their molecules, and interhalide compounds of halide-derived compounds, which are liquid at ambient temperature and do not have oxygen, in their molecule, according to the following general scheme:

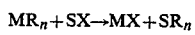

where
R is an organic group,
M is a metal,
S is either an organic group or a halide,
X is a halide,
MX is the glass-forming solid salt,
$SR_n$ is the sum of volatile reaction products.

The foregoing and other characteristics of the present invention will become clearer from the following description of a preferred embodiment thereof given by way of non-limiting example.

The process provided by the invention uses liquid reactants which duly combined yield a solid salt and other volatile products.

A general reaction scheme is the following:

$$MR_n + SX \rightarrow MX + SR_n$$

where
R is an organic group,
M is a metal,
S is an organic group or a halide,
X is a halide,
MX is a solid glass-forming salt,
$SR_n$ is the sum of volatile reaction products.

More particularly the reactants consist of oxygen-free organometallic compounds, which are liquid at ambient temperature.

As a secondary property one or more halide groups may be present in the organometallic compound molecule.

The halide suppliers are liquid at ambient temperature, do not present oxygen in their molecule (i.e. are oxygen-free) and are of inter-halide or halide-derived kind. Some reactants with their melting temperatures $T_f$ and boiling temperatures $T_e$ are listed below. Organometallic, halide-derived and inter-halide compounds are orderly listed as follows:

|  | $T_f$(°C.) | $T_e$(°C.) |
| --- | --- | --- |
| Organometallic compounds: | | |
| $(CH_3)_3$ Al |  | 130 |
| $(C_2H_5)_3$ Al | −18 | 194 |
| $(CH_3)_2$ Al Cl | −50 | 84 |
| $(C_2H_5)_2$ Al Cl | −50 | 126 |
| $(CH_3)_4$ Pb | −27.5 | 110 |
| $(C_2H_5)_4$ Pb | −136.8 | 200 |
| $(C_2H_5)$ Sn | −12 | 150 |
| Halide - derived compounds: | | |
| CH $Cl_3$ | −63.5 | 61.2 |
| $CH_2 Cl_2$ | −97 | 41 |
| $CH_3CHCl_2$ | −96 | 57 |
| $ClCH_2CH_2Cl$ | −35 | 84 |
| $C_6 H_5 F$ | −39.2 | 85 |
| $C_6 H_{11} F$ | 12 | 75 |
| $C_7 F_{14}$ | −44 | 76 |
| Interhalide compounds: | | |
| I $Cl_3$ |  | 77 |
| I Cl | 27.2 | 97.4 |
| I $F_5$ | 9.6 | 98 |

Glasses desired are obtained by mixing the reactants in the required concentrations, in particular as concerns metal sources. When the reactants are not easily mixed, a suitable solvent, e.g. $CCl_4$, $CH_2Cl_2$, can be used.

The reaction speed can be controlled both thermally and by varying the concentrations of halide sources.

Some possible reactions between the abovementioned compounds are listed below. Upward arrows indicate volatile products, downwards arrows indicate solid products.

$$3(CH_3)_3Al + 2CHCl_3 \rightarrow 3AlCl_3 \downarrow + 3CH_2CH_2 \uparrow + 2CH_4 \uparrow$$

$$3(CH_3)_2AlCl + 2CHCl_3 \rightarrow 3AlCl_3 \downarrow + 2CH_3-CH_3 \uparrow + 2CH_2=CH_2 \uparrow$$

$$2Al(CH_3)_3 + 2ICl_3 \rightarrow 2AlCl_3 \downarrow + I_2 \uparrow + 3CH_3CH_3 \uparrow$$

$$2Al(C_2H_5)_3 + 2ICl_3 \rightarrow 2AlCl_3 \downarrow + I_2 \uparrow + 3CH_3CH_3 \uparrow + 3CH_2CH_2 \uparrow$$

$$10Al(CH_3)_3 + 6IF_5 \rightarrow 10AlF_3 \downarrow + 3I_2 \uparrow + 15CH_3CH_3 \uparrow$$

$$10Al(C_2H_5)_3 + 6IF_5 \rightarrow 10AlF_3 \downarrow + 3I_2 \uparrow + 15CH_3CH_3 \uparrow + 15CH_2CH_2 \uparrow$$

The salt-producing reaction is the sum of two simple decomposition reactions.

The first concerns the organometallic compound decomposition, which is a strong reducing agent.

It can be partly decomposed by thermal action or by slightly-polar solvents.

A general scheme is the following:

$$MR_3 \rightarrow M^{3+} + 3R^-$$

The second reaction consists in a nucleophilic substitution reaction, producing the halide ion. As a rule, we have $$SX \longrightarrow S^+ + X^- \xrightarrow{:R} SR + X^-$$

Such substitution occurs in presence of a nucleophilic agent: R which can derive from the solvent.

In effect thermal dissociation of organometallic compounds forms highly mucleophilic $R^-$ agents.

Whether the last reaction is of first order (SN1) with positive-charge formation or of second order (SN2) with formation of bipolar intermediate product, the speed of reaction depends on SX concentration on the common solvent polarity, and on steric factors (free mean path, cross section, molecular geometric configuration).

The reaction temperature interval is determined by the liquid state of reactants, that is why it ranges between the highest melting temperature and the lowest boiling temperature of the compounds used. Anyway, the maximum temperature cannot exceed the glass forming value of the final matrix. In such a way the purification of salts obtained, can be effected, in order to purify them from the reactants and the reaction products possibly incorporated, prior to glass formation.

We claim:

1. A process for manufacturing a halide glass which comprises the steps of:

reacting an organometallic compound selected from the group which consists of:

$(CH_3)_3Al$, $(C_2H_5)_3Al$, $(CH_3)_2AlCl$, $(C_2H_5)Sn$, $(C_2H_5)_2AlCl$, $(CH_3)_4Pb$ and $(C_2H_5)_4Pb$;

with an interhalide or halide-derived compound selected from the group which consists of:

$CHCl_3$, $C_7F_{14}$, $C_6H_5F$, $C_6H_{11}F$, $ClCH_2CH_2Cl$, $CH_2Cl_2$, $CH_3CHCl_2$, $IF_5$, $ICl_3$, and $ICl$, in liquid phase, in amounts and at a temperature at which a glass-forming solid salt is precipitated and all remaining elements of the reacted compounds are volatilized as reaction products; and vitrifying said glass-forming solid salt to form a glass article.

2. The process defined in claim 1 wherein the reaction is effected at a temperature comprised between the highest melting temperature and the lowest boiling temperature of the compounds used.

3. The process defined in claim 2 wherein the reaction is effected at a temperature lower than the glass-forming temperature.

4. The process defined in claim 1 wherein the halide-derived compound is employed and is selected from the group which consists of:

$CHCl_3$, $C_7F_{14}$, $C_6H_5F$, $C_6H_{11}F$, $ClCH_2CH_2Cl$, $CH_2Cl_2$, and $CH_3CHCl_2$.

5. The process defined in claim 1 wherein the interhalide compound is employed and is selected from the group which consists of:

$IF_5$, $ICl_3$, and $ICl$.

* * * * *